United States Patent [19]

Serpanos

[11] Patent Number: 5,528,763
[45] Date of Patent: Jun. 18, 1996

[54] SYSTEM FOR ADMITTING CELLS OF PACKETS FROM COMMUNICATION NETWORK INTO BUFFER OF ATTACHMENT OF COMMUNICATION ADAPTER

[75] Inventor: Dimitrios N. Serpanos, Ossining, N.Y.

[73] Assignee: International Business Machines Corporation, Armonk, N.Y.

[21] Appl. No.: 121,020

[22] Filed: Sep. 14, 1993

[51] Int. Cl.⁶ ............................... H04L 9/00; H04J 3/02
[52] U.S. Cl. .................. 395/250; 395/200.2; 370/60; 370/94.1; 364/239; 364/239.6
[58] Field of Search ............................ 395/250, 200, 395/200.2; 370/60, 61, 94.1

[56] References Cited

U.S. PATENT DOCUMENTS

| | | | |
|---|---|---|---|
| 4,500,990 | 2/1985 | Akashi | 370/85.3 |
| 4,607,363 | 8/1986 | Platel et al. | 370/94.1 |
| 4,769,811 | 9/1988 | Eckberg, Jr. et al. | 370/60 |
| 4,785,449 | 11/1988 | Nakamura et al. | 370/85 |
| 4,849,968 | 7/1989 | Turner | 370/60 |
| 4,920,534 | 4/1990 | Adelman et al. | 370/94.1 |
| 4,953,157 | 8/1990 | Franklin | 370/60 |
| 5,165,021 | 11/1992 | Wu et al. | 395/250 |
| 5,303,238 | 4/1994 | Brodd et al. | 370/94.1 |
| 5,303,302 | 4/1994 | Burrows | 380/49 |
| 5,321,695 | 6/1994 | Faulk, Jr. | 370/94.1 |
| 5,347,514 | 9/1994 | Davis et al. | 370/60 |
| 5,367,643 | 11/1994 | Chang et al. | 395/325 |
| 5,390,299 | 2/1995 | Rege et al. | 395/250 |

FOREIGN PATENT DOCUMENTS

| | | |
|---|---|---|
| 2033290 | 6/1991 | Canada . |
| 0526104 | 4/1992 | European Pat. Off. . |
| 0481505 | 4/1992 | European Pat. Off. . |
| 0481507 | 4/1992 | European Pat. Off. . |
| 0516042 | 12/1992 | European Pat. Off. . |
| 0475350 | 3/1995 | European Pat. Off. . |
| 1166644 | 6/1989 | Japan . |
| 1228242 | 9/1989 | Japan . |
| 2002757 | 1/1990 | Japan . |
| 322736 | 1/1991 | Japan . |
| 3190341 | 8/1991 | Japan . |
| 3205937 | 9/1991 | Japan . |
| 4000838 | 1/1992 | Japan . |
| 4322538 | 11/1992 | Japan . |
| 4346538 | 12/1992 | Japan . |

*Primary Examiner*—Krisna Lim
*Attorney, Agent, or Firm*—Douglas W. Cameron

[57] ABSTRACT

A method and apparatus for admitting packets into the buffer of an attachment of a communications adapter. More specifically, a discard bit is maintained in a table of the attachment to indicate whether a cell of a packet was previously discarded because of a buffer full condition. All subsequently received cells of a packet are automatically discarded if the discard bit is in the state indicating that a cell was previously discarded because the buffer was full.

6 Claims, 4 Drawing Sheets

SYSTEM FOR ADMITTING CELLS OF PACKETS FROM COMMUNICATION NETWORK INTO BUFFER OF ATTACHMENT OF COMMUNICATION ADAPTER

DESCRIPTION

1. Technical Field

This invention relates to a buffer admission policy for attachments to a communications network. More specifically, the admissions policy is designed to increase throughput through the network attachment.

2. Description of the Prior Art

Due to cost considerations, in many communications networks there is a need to connect a large number of attachments to a relatively small number of network adapters. This need leads to designs where the effective data throughput from the attachment to the adapter does not match the bandwidth of the attached network link.

This mismatch is especially acute in todays technology where we are dealing with 100 Mbps, throughput rates for the attachments. Future generations of attachments will need to support even higher speeds, which in turn further aggravate the mismatch problem.

U.S. patent application, Ser. No. 07/651,894, entitled, "Generic High Bandwidth Adapter Having Data Packet Memory Configured In Three Level Hierarchy For Temporary Storage Of Variable Length Data Packets Having Data Packet Memory Configured in Three Level Hierarchy For Temporary Storage Of Variable Length Data Packets", filed on Feb. 6, 1991, issued on Nov. 22, 1994, as U.S. Pat. No. 5,367,643, to Chang et al, and assigned to the same assignee as the current application, describes a packet memory and adapter in which this invention could be implemented. The previous application is hereby incorporated by reference.

An attachment for the above adapter, such as an Asynchronous Transfer Mode (ATM) attachment, typically has a limited amount of elastic buffering for synchronization with a packet memory data path, and for temporary storage of incoming packets until a data path is established from the attachment to the packet memory of the adapter. In a typical ATM attachment, cells may be lost if there is a gap between the network link speed and the speed at which packets can be stored in the packet memory. Loss of a single cell of a packet results in incomplete packet, places an overhead for retransmitting the incomplete packet, and introduces an additional delay to the end to end delay in the transmission of the packet. This problem becomes particularly acute in cases where successive cells belong to different packets. A loss of a burst of cells may result in a large number of incomplete packets.

One attempt to solve the above problems is described in European Patent Application 0 516 042 A2, published on Feb. 12, 1992. This patent teaches the discarding of a packet when there are certain errors in particular incoming cells of the packet. Such errors include errors in the value of the virtual path identifier, or the virtual channel identifier, in the sequence number, length indicator, or data CRC, of the packet. However, this patent does not deal with a buffer full condition in the attachment.

With most known methods of discarding cells of a packet, cells are discarded only when no memory is available for new incoming cells. With such methods, cells (either incoming or stored) are dropped, depending on various criteria such as: priority, buffer occupancy, or availability, size thresholds, "markings", etc.

Examples of methods based on priority are:

1. TR-29.1584 CPD-Raleigh by V. G. Kulkarni and T. E. Tedijanto, where different priority cells are discarded so that minimized distortion is achieved.
2. JP-03-22736 (Published and Unexamined) to Matsushita Electric, where low priority cells are discarded.
3. EP-526104-A2 (Published and Unexamined) to AT&T, where the discarded cell(s) belong to the lowest priority queue of the output port with the largest number of queued cells.
4. U.S. Pat. No. 5,165,021 by Wu et al, where packets are discarded based on a number that is a function of the packet's priority and destination.

However, such methods do not associate a cell with the packet in which it belongs and does discard cells that belong to the same packet which had at least on previously discarded cell because of buffer overflow.

Examples of methods based on buffer occupancy include:

1. JP-04-838 (Published and Unexamined) to OKI Electric, where packets are processed first in order to allow a large buffer space to be freed fast.
2. JP-01-228242 (Published and Unexamined) to Fujitsu, where a packet is dropped when a buffer overflows and the data loss is indicated.
3. EP-481507-A (Published and Unexamined) to Fujitsu, where cells are discarded based on the number of cells for the same call already stored.
4. EP-481505-A (Published and Unexamined) to Fujitsu, where cells are discarded based on how many cells are already stored in memory.
5. JO-3205937-A (Published and Unexamined) to Hitachi, where packets are discarded when a threshold is passed in memory.
6. U.S. Pat. No. 4,500,990 by Akashi, where an "obstruction signal" is asserted when it is identified that there is not enough buffer to store an additional portion of a delivered packet.
7. U.S. Pat. No. 4,849,968 by Turner, where packets are marked (and thus may be dropped) when they occupy buffer space in excess of the allocated space for the corresponding call.
8. U.S. Pat. No. 4,953,157 by Franklin et al, where packets are discarded based on a "watermark" number related to their priority, and on the state of a buffer.
9. U.S. Pat. No. 4,920,534 by Adelmann, where bits within a packet are discarded, when the number of stored bits exceeds certain thresholds.

With other known methods of discarding cells, cells are discarded on the basis of delay and/or "quality of service" requirements such methods are described in:

1. JP-02-2757 (Published and Unexamined) assigned to NTT Corp., where a packet based on timing calculations related to delay.
2. CA-2033290-A (Published and Unexamined) assigned to Toshiba Corp., where packets are discarded based upon the number of internal switches the packet traversed to reach its destination.
3. JO-1166644-A (Published and Unexamined) to OKI Electric, which discards packets based on their delay through the system.
4. U.S. Pat. No. 4,769,811 by Eckberg, Jr. et al, which teaches marking packets when they exceed the bandwidth allocated to a (or negotiated by) a user. Marked packets are discarded in case of congestion.

5. U.S. Pat. No. 4,607,363 by Platel et al, which teaches discarding packets based on how long they have been stored.

6. IBM Technical Disclosure Bulletin, Vol. 33, No. 4, pp. 21–28 entitled, "Overflow/Fault Recovery Using Automatic Network Routing", by Y. Ofek, published September 1990, describes a method wherein the body of a packet (not the header) is dropped if the packet should be transmitted on a failed link, or when memory overflows.

7. JP-04-346538-A (Published and Unexamined) assigned to NEC, describes a method wherein test cells are discarded.

8. JO-3190341-A (Published and Unexamined) assigned to Fujitsu, teaches discarding cells based on a flat information using some random number generator based technique.

Also TDB Vol. 3, No. 4, (noted above), JP-04-838 (Published and Unexamined), (Published and Unexamined) JP-01-228242, JP-04-322538-A (Published and Unexamined), EP-475350-A, U.S. Pat. No. 5,179,557, U.S. Pat. No. 4,500,990, and report TR-29.1584 are not designed to operate in a reassembly environment. The reassembly environment provides a very difference environment for system operation, as the following paragraph, for example, indicates. In environments where reassembly is not required or contiguous packets are transmitted, the possible system failures are fewer and thus the system is more robust. It is in the reassembly environment that cases like the one examined in this application appear.

There is therefore, a need for a buffer admissions policy, or attachment to overcome these problems, especially when one is dealing with throughput rates in excess of 100 Mbps, and especially in an environment where an adapter has a large (>5) number of attachments.

SUMMARY OF THE INVENTION

It is, therefore, an object of this invention to increase the throughput of packets through an attachment of an adapter by discarding cells of packets in which cells were previously discarded.

It is another object of this invention to enable a large number of attachments to be attached to a network adapter.

With this invention a discard bit is maintained in a table of the attachment to indicate whether a cell of a packet was previously discarded because of a buffer full condition. All subsequently received cells of a packet into the adapter are automatically discarded if the discard bit is in a state indicating that a cell was previously discarded because the buffer of the attachment was full. The subsequently arriving cells of the packet could be discarded even if the buffer were not currently full.

DESCRIPTION OF THE PREFERRED EMBODIMENT

Figure 1:
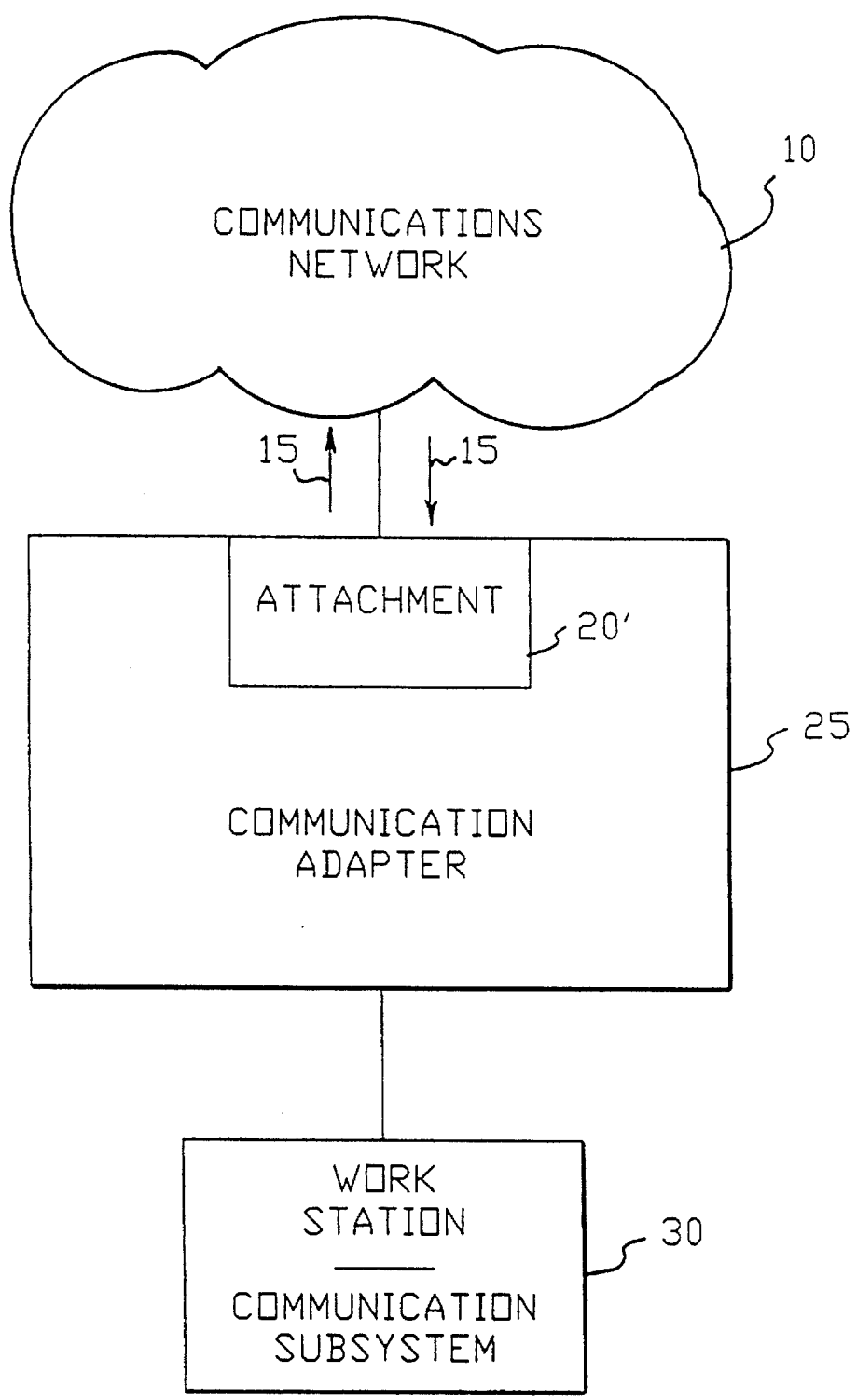
FIG. 1 is schematic illustration of the overall environment in which the invention is implemented. More specifically, this invention deals with attachment 20' of communications adapter 25.
Figure 2:
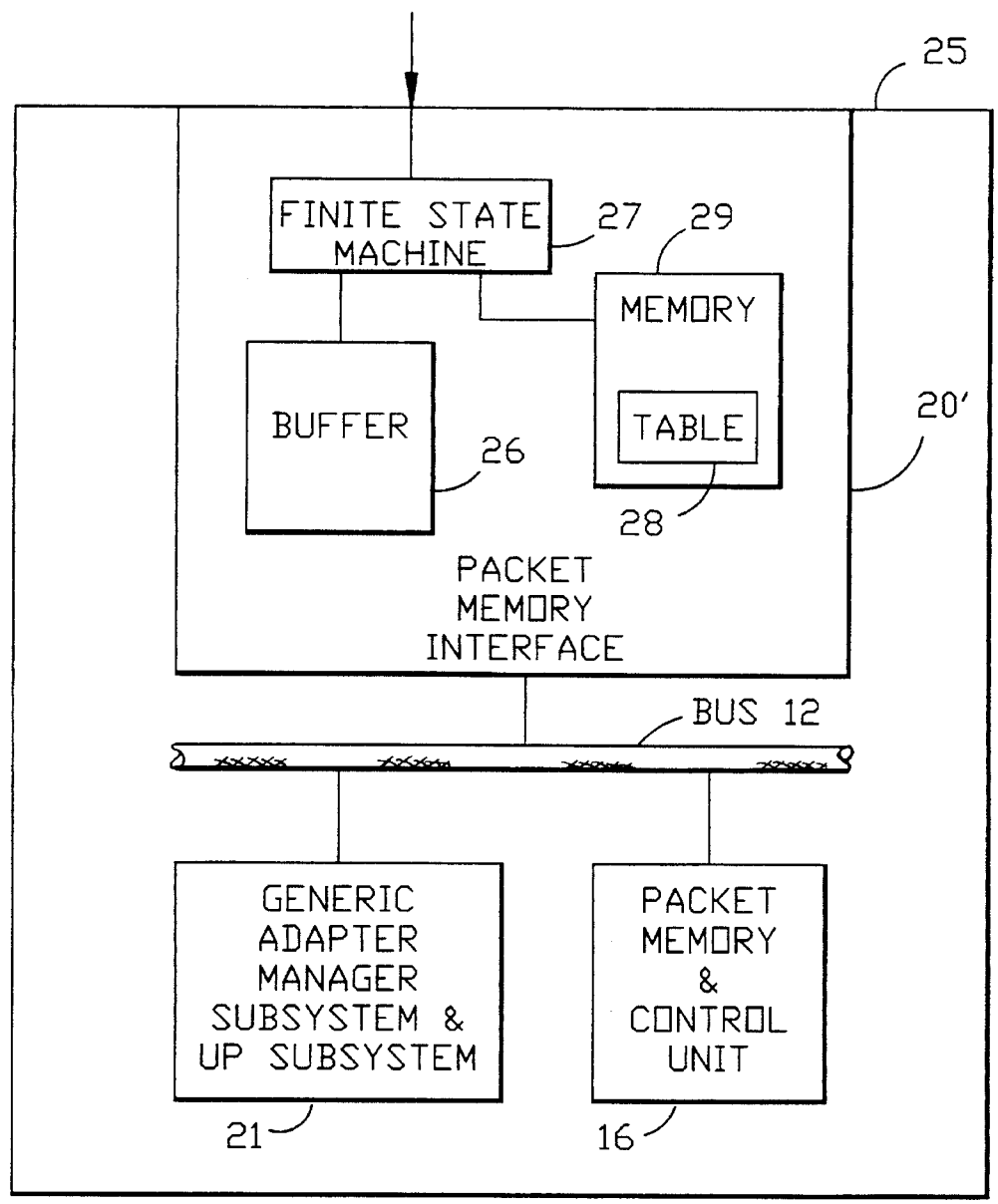
FIG. 2 is a schematic illustration of the communications adapter implementing this invention.
Figure 4:
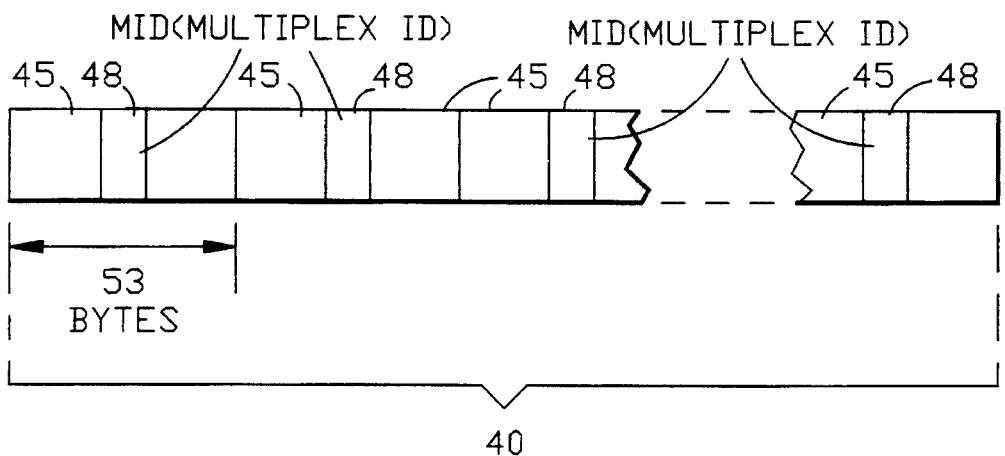
FIG. 4 schematically illustrates a packet with 53 bytes cells with each cell having a Multiplex ID.

Shown in FIG. 1 is the overall environment in which the invention is implemented. Shown is a communications adapter 25 which is attached to network 10 through attachment 20'. The adapter 25 is use to provide communications between a work station or communication subsystem 30 and the network. The adapter could also be part of the work station or communication subsystem. Referring to FIGS. 2 and 4, packets 40 flow between network 10 and the adapter 25 in both directions. Each packet is comprised of a number of typically 53 byte cells 45, with each cell having a Multiplex II) (MID) 48 identifying the packet to which each respective cell belongs.

Shown in FIG. 2 is a more detailed schematic of the communications adapter 25. With the exception of the attachment 20', this communications adapter is basically the same as that as described FIG. 1 of an earlier application assigned to the same assignee as the current application. The earlier application, U.S. Ser. No. 651,894, entitled, "Generic High Bandwidth Adapter", filed on Feb. 6, 1991, issued on Nov. 22, 1994, as U.S. Pat. No. 5,367,643, to Chang et al, and is incorporated by reference. The attachment 20' comprises: a Finite State Machine (FSM) 27, attachment buffer 26, and attachment control memory 29, which includes table 28, which table is more fully illustrated in FIG. 3. Shown also in FIG. 2 is the packet memory and controller unit 16.

Figure 3:
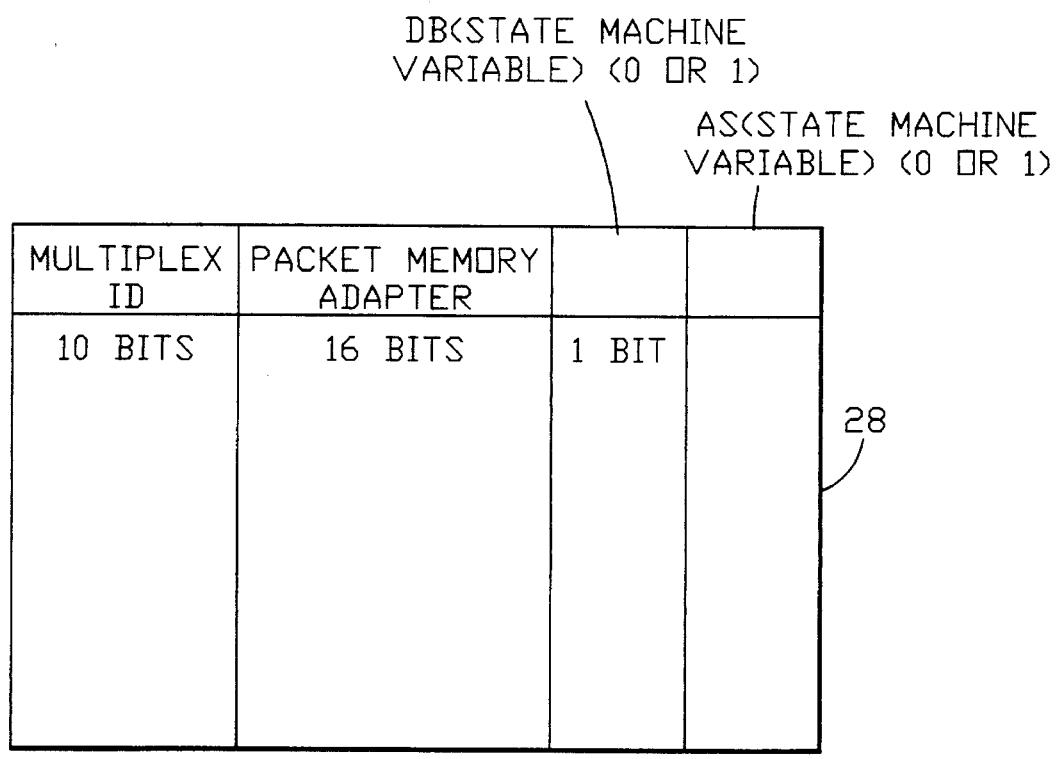
FIG. 3 is a schematic illustration of the table for maintaining a packet memory address and discard bit for each Multiplex Identification (MID).

Referring again to FIG. 2, when an arriving cell from the network reaches the attachment, the MID is extracted from the cell by FSM 27, and this value of the MID is used to search table 28, which is implemented using content addressable memory. Referring to FIG. 3, if the MID is found in the table, then the corresponding packet memory address (PMA) found in the table is the address in the packet memory 16 where the data of the cell should be stored. If the MID is not found, a new entry will be created in the table if there is enough space in the attachment control memory to store the entry. The corresponding packet memory address for the new entry is a response to a primitive (REQ RX) which is issued as described in the aforementioned patent application. If there is not enough space in the attachment control memory, then the cell will be discarded, and no new entry will be made in the table.

If the MID is stored in the table, then the corresponding PMA and the discard bit value, which is also found in the table, is returned to the FSM 27. If the value of DB is 1, the incoming cell is discarded. If the value of DB is 0, and there is enough space in the attachment buffer 26 to temporarily store the cell until the data of the cell can be transferred by a bus 12 to packet memory 16, then a variable AS stored in the FSM is set to 1. If there is not enough space in the attachment buffer, then the variable AS is set 0.

Figure 5:
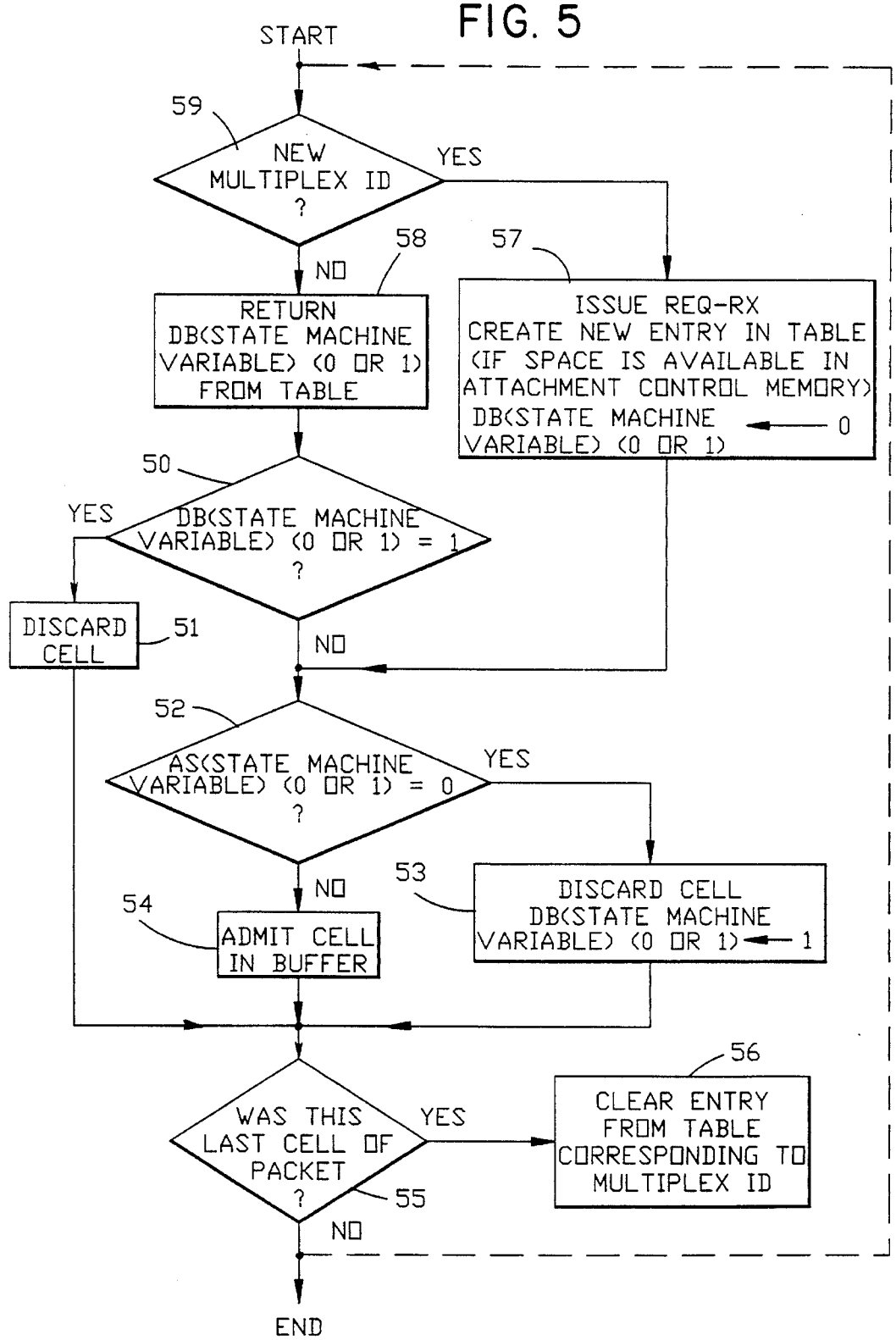
FIG. 5 is a flow diagram describing the operation of the invention of the current application.

FIG. 5 typically illustrates the flow diagram or the logic operation of the FSM. As described above, when an arriving cell reaches the attachment, the MID is extracted, and this value is used to search table 28. As shown at 59, it is first determined whether the MID is already stored in the table.

If the MID is not stored in the table, then a new entry will be created in the table if space is available in the attachment control memory. See 57. This newly created entry will contain a PMA and a DB value initialized to 0. The PMA value is received in response to a REQ RX primitive issued by attachment 20'. The issuance of this primitive is fully described in the aforementioned patent application. If, however, the MID is found in the table, then the corresponding value of DB is returned to the Finite State Machine as shown at 58. As shown at 50, if DB equals 1, then the cell with the corresponding MID will be discard regardless of the value of AS as shown at 51. If DB equals 0 for a corresponding MID, then the decision as to whether a cell with that MID is to be discarded depends upon the value of AS. As shown at 52, regardless of the value of DB, if AS equals 0, the corresponding cell is discarded 53 since there is no space in the attachment buffer to store the cell. If AS equal 1 when DB equals 0, then this cell will be admitted into the attachment buffer. Thus, with the logic of the Finite State Machine, a cell will not be admitted into the attachment buffer if a cell of the same packet was previously discarded because there was no space in the attachment buffer. At 55, the Finite State Machine checks to see if the cell is the last cell of a corresponding packet. If the cells is the last cell of the packet then the entry corresponding to the MID is cleared from the table. The design of the logic for the FSM is a basic skill in engineering and appears in basic text books such as, "Digital Design" by Morris Mano, Prentice Hall, 1984. From the flow diagram of FIG. 5, it would be obvious to one of ordinary skill in the art to implement this invention in software.

Having thus described our invention, what we claim as new and desire to secure by Letters Patents is:

1. A method of admitting cells of packets from a communications network into a buffer of an attachment of an adapter attached to said communications network, said method comprising:

a. storing a table with a plurality of entries in a memory of said adapter, with each of said entries in said table having an identification identifying one of said packets and a variable indicating whether a cell of said one packet indicating whether a cell of a corresponding one of said packets was previously refused admission into said buffer because space was unavailable in said buffer; and b. refusing to admit subsequently arriving cells of a packet of said packets from said network if an entry, of said entries, for latter said packet indicates that a cell of said packet was previously refused admission into said buffer.

2. A method as recited in claim 1 wherein said cells of said packets are interleaved with each other, and wherein each of said cells a multiplex identification therein indicating which one of said packets it belongs to.

3. A method as recited in claim 2, wherein said entries of said table are listed by a corresponding said multiplex identification for each of packets whose multiplex identification is listed in said table.

4. An apparatus for admitting cells of packets from a communications network into a buffer of an attachment of an adapter attached to said communications network, said apparatus comprising:

a. means for storing a table with a plurality of entries in a memory of said adapter, with each of said entries in said table having an identification identifying one of said packets and a variable indicating whether a cell of said one packet was previously refused admission into said buffer because space as unavailable in said buffer; and b. means for refusing to admit subsequently arriving cells of a packet of said packets from said network if an entry, of said entries, having said identification identifying latter said packet indicates that a cell of said packet was previously refused admission into said buffer.

5. An apparatus as recited in claim 4 wherein said cells of said packets are interleaved with each other, and wherein each of said cells a multiplex identification therein indicating which one of said packets it belongs to.

6. An apparatus as recited in claim 4, wherein said entries of said table are listed by a corresponding said multiplex identification for each of packets whose multiplex identification is listed in said table.

* * * * *